United States Patent
Zhang et al.

(10) Patent No.: US 11,567,613 B2
(45) Date of Patent: Jan. 31, 2023

(54) SIGNAL PROCESSING SYSTEM, CHIP AND ACTIVE STYLUS

(71) Applicant: Shenzhen Goodix Technology Co., Ltd., Shenzhen (CN)

(72) Inventors: Guanjun Zhang, Shenzhen (CN); Shibo Li, Shenzhen (CN); Feipeng Jiang, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 203 days.

(21) Appl. No.: 17/060,022

(22) Filed: Sep. 30, 2020

(65) Prior Publication Data

US 2021/0019019 A1    Jan. 21, 2021

Related U.S. Application Data (63) Continuation of application No. PCT/CN2019/094360, filed on Jul. 2, 2019.

(51) Int. Cl.
  *G06F 3/041*    (2006.01)
  *G06F 3/044*    (2006.01)
  (Continued)

(52) U.S. Cl.
  CPC .......... *G06F 3/0441* (2019.05); *G06F 3/0383* (2013.01); *G06F 3/03545* (2013.01)

(58) Field of Classification Search
  CPC .. G06F 3/0441; G06F 3/03545; G06F 3/0383; G06F 3/0412; G06F 3/0416; G06F 3/044; G06F 3/041
  See application file for complete search history.

(56) References Cited

U.S. PATENT DOCUMENTS

| 8,502,801 B2 | 8/2013 | Goh et al. |
| 2013/0188669 A1 | 7/2013 | Li et al. |

(Continued)

FOREIGN PATENT DOCUMENTS

| CN | 102132519 A | 7/2011 |
| CN | 102207804 A | 10/2011 |

(Continued)

OTHER PUBLICATIONS

Shenzhen Goodix Technology Co., Ltd., International Search Report, PCT/CN2019/094360, dated Mar. 23, 2020, 4 pgs.

(Continued)

*Primary Examiner* — Lunyi Lao
*Assistant Examiner* — Jarurat Suteerawongsa
(74) *Attorney, Agent, or Firm* — USCH Law, PC (57) ABSTRACT

Some embodiments of the present disclosure provide a signal processing system, a chip and an active stylus. The signal processing system includes: a pre-amplifier circuit, configured to pre-amplify a received DSSS signal and output a pre-amplified DSSS signal; a low-pass filter circuit, configured to filter the pre-amplified DSSS signal and output a filtered DSSS signal; an analog-to-digital converter circuit, configured to sample the filtered DSSS signal and output a sampled DSSS signal; a noise detecting and filtering-out circuit, configured to filter out a noise in the sampled DSSS signal and output a noise-filtered DSSS signal; and a digital demodulation circuit, configured to demodulate the noise-filtered DSSS signal to output a demodulated signal. The signal processing system can have strong anti-interference ability and high sensitivity through the noise detecting and filtering-out circuit and automatically controlling a gain of the pre-amplifier circuit.

20 Claims, 7 Drawing Sheets

(51) Int. Cl.
G06F 3/0354 (2013.01)
G06F 3/038 (2013.01)

(56) References Cited

U.S. PATENT DOCUMENTS

| | | | |
|---|---|---|---|
| 2014/0176495 A1* | 6/2014 | Vlasov | G06F 3/0441 |
| | | | 345/174 |
| 2014/0375593 A1 | 12/2014 | Singh | |
| 2016/0231854 A1* | 8/2016 | Koo | G06F 3/047 |
| 2016/0259432 A1 | 9/2016 | Bau et al. | |
| 2017/0123519 A1 | 5/2017 | Reitan et al. | |
| 2018/0157341 A1* | 6/2018 | Oda | G06F 3/0446 |
| 2019/0004666 A1* | 1/2019 | Jiang | G06F 3/0442 |

FOREIGN PATENT DOCUMENTS

| | | | | |
|---|---|---|---|---|
| CN | 105843444 A | | 8/2016 | |
| CN | 107111389 A | * | 8/2017 | ......... G06F 3/03545 |
| CN | 107111389 A | | 8/2017 | |
| CN | 109521893 A | | 3/2019 | |
| CN | 109901734 A | | 6/2019 | |
| WO | 2018049636 A1 | | 3/2018 | |

OTHER PUBLICATIONS

Shenzhen Goodix Technology Co., Ltd., Extended European Search Report, EP19920641.8, dated Apr. 19, 2021, 10 pgs.

* cited by examiner

SIGNAL PROCESSING SYSTEM, CHIP AND ACTIVE STYLUS

CROSS-REFERENCE TO RELATED APPLICATIONS

The present application is a continuation application of PCT Application No. PCT/CN2019/094360, filed Jul. 2, 2019, which is incorporated herein by reference in its entirety.

TECHNICAL FIELD

The present disclosure relates to the field of touch technology, in particular to a signal processing system, a chip and an active stylus.

BACKGROUND

In the existing technology, direct sequence spread spectrum (DSSS) signal transmission is usually applied in a radio frequency environment.

SUMMARY

The present disclosure provides a signal processing system, a chip and an active stylus, which use a DSSS signal to realize a synchronization between a screen terminal and a stylus terminal, a sending of commands and other operations.

The present disclosure provides a signal processing system, applied to an active stylus, including:

a pre-amplifier circuit, configured to pre-amplify a received DSSS signal and output a pre-amplified DSSS signal;

a low-pass filter circuit, configured to filter the pre-amplified DSSS signal and output a filtered DSSS signal;

an analog-to-digital converter circuit, configured to sample the filtered DSSS signal and output a sampled DSSS signal;

a noise detecting and filtering-out circuit, configured to filter out a noise in the sampled DSSS signal and output a noise-filtered DSSS signal; and a digital demodulation circuit, configured to demodulate the noise-filtered DSSS signal to output a demodulated signal.

In some embodiments, a gain of the pre-amplifier circuit is adaptively adjusted according to the sampled DSSS signal.

In some embodiments, if the sampled DSSS signal has an amplitude less than a first threshold, the gain of the pre-amplifier circuit is increased. Alternatively, if the sampled DSSS signal has an amplitude greater than a second threshold, the gain of the pre-amplifier circuit is decreased.

In some embodiments, the second threshold is greater than the first threshold.

In some embodiments, the low-pass filter circuit is an anti-alias filter circuit.

In some embodiments, the pre-amplifier circuit is a transimpedance amplifier circuit.

In some embodiments, the noise detecting and filtering-out circuit includes a noise detecting module and a noise filtering-out module.

In some embodiments, the noise detecting module is configured to perform a fast Fourier transform analysis on the sampled DSSS signal to detect a frequency of a noise signal in the sampled DSSS signal.

In some embodiments, the noise filtering-out module includes a notch filter. The noise filtering-out module is configured to filter out the noise in the sampled DSSS signal detected by the noise detecting module, wherein a frequency of the notch filter is equal to the frequency of the noise signal.

In some embodiments, the digital demodulation circuit includes a preset autocorrelation signal. The digital demodulation circuit processes the preset autocorrelation signal and the DSSS signal output by the noise detecting and filtering-out circuit to obtain the demodulated signal.

In some embodiments, the digital demodulation circuit processing the preset autocorrelation signal and the DSSS signal output by the noise detecting and filtering-out circuit to obtain the demodulated signal includes:

performing dot product between the preset autocorrelation signal and the DSSS signal output by the noise detecting and filtering-out circuit bit-by-bit to obtain a dot product result;

accumulating the dot product results to obtain an accumulation result; and demodulating the DSSS signal output by the noise detecting and filtering-out circuit according to the accumulation result to obtain the demodulated signal.

In some embodiments, the performing dot product between the preset autocorrelation signal and the DSSS signal output by the noise detecting and filtering-out circuit bit-by-bit to obtain the dot product result specifically includes:

performing dot product between a B-bit DSSS signal output by the noise detecting and filtering-out circuit and a B-bit preset autocorrelation signal bit-by-bit to obtain a dot product result, wherein the B is a number of bits of the preset autocorrelation signal.

In some embodiments, the accumulating the dot product results to obtain the accumulation result specifically includes:

accumulating the bit-by-bit dot product results of the B-bit DSSS signal output by the noise detecting and filtering-out circuit and the B-bit preset autocorrelation signal to obtain an accumulation result; and shifting the whole preset autocorrelation signal backward by 1 bit.

In some embodiments, the demodulating the DSSS signal output by the noise detecting and filtering-out circuit according to the accumulation result to obtain the demodulated signal specifically includes:

demodulating the DSSS signal output by the noise detecting and filtering-out circuit according to a comparison result of the accumulation result and a preset threshold to obtain the demodulated signal.

In some embodiments, the demodulating the DSSS signal output by the noise detecting and filtering-out circuit according to the comparison result of the accumulation result and the preset threshold specifically includes:

judging a data as a useful signal if the accumulation result is greater than a third threshold or smaller than a fourth threshold; and judging the data as an unwanted signal if the accumulation result is smaller than the third threshold and greater than the fourth threshold.

In some embodiments, the useful signal includes a first type of signal and a second type of signal, and the judging the data as the useful signal if the accumulation result is greater than the third threshold or smaller than the fourth threshold includes:

identifying the B-bit DSSS signal output by the noise detecting and filtering-out circuit as the first type of signal if it is detected that the accumulation result is greater than the third threshold;

identifying the B-bit DSSS signal output by the noise detecting and filtering-out circuit as the second type of signal if it is detected that the accumulation result is smaller than the fourth threshold; and the third threshold is greater than the fourth threshold.

In some embodiments, after identifying the B-bit DSSS signal output by the noise detecting and filtering-out circuit as the first type of signal if it is detected that the accumulation result is greater than the third threshold, the circuit further includes taking a starting time of collecting the B-bit DSSS signal output by the noise detecting and filtering-out circuit as a starting time of the identified first type of signal; and after identifying the B-bit DSSS signal output by the noise detecting and filtering-out circuit as the second type of signal if it is detected that the accumulation result is smaller than the fourth threshold, the circuit further includes taking the starting time of collecting the B-bit DSSS signal output by the noise detecting and filtering-out circuit as a starting time of the identified second type of signal.

In some embodiments, the digital demodulation circuit includes a threshold setting module. The threshold setting module is configured to calculate a jitter value of the unwanted signal and update the third threshold and the fourth threshold according to the jitter value of the unwanted signal.

In some embodiments, a formula for updating the third threshold and the fourth threshold by the threshold setting module according to the jitter value of the unwanted signal is:

$$\text{Threshold\_}H = 3*\sigma,\ \text{Threshold\_}L = -3*\sigma$$

where Threshold_H is the third threshold, Threshold_L is the fourth threshold, and σ is the jitter value of the unwanted signal.

In some embodiments, the signal processing system receives a DSSS signal transmitted from a touch screen through a coupling capacitance formed between the active stylus and the touch screen.

In some embodiments, the active stylus includes a primary electrode and a secondary electrode. The coupling capacitance formed between the active stylus and the touch screen is specifically as follows:

a coupling capacitance formed between the primary electrode and the touch screen, and/or a coupling capacitance formed between the secondary electrode and the touch screen.

The present disclosure further provides a chip, including the above-described signal processing system.

The present disclosure further provides an active stylus, including the above-described chip.

The present disclosure further provides a signal processing device, including:

a pre-amplifier circuit, configured to pre-amplify a received DSSS signal and output a pre-amplified DSSS signal;

a low-pass filter circuit, configured to filter the pre-amplified DSSS signal and output a filtered DSSS signal;

an analog-to-digital converter circuit, configured to sample the filtered DSSS signal and output a sampled DSSS signal;

a noise detecting and filtering-out circuit, configured to filter out a noise in the sampled DSSS signal and output a noise-filtered DSSS signal; and a digital demodulation circuit, configured to demodulate the noise-filtered DSSS signal to output a demodulated signal.

In some embodiments of the present disclosure, when the signal processing system receives the DSSS signal, the signal processing system can have strong anti-interference ability through the noise detecting and filtering-out circuit and automatically controlling the gain of the pre-amplifier circuit. Automatically controlling the gain of the pre-amplifier circuit can enable the signal processing system to adapt to different application scenarios and have high sensitivity, so as to realize the synchronization of the screen terminal and the stylus terminal, the sending of commands and other operations.

BRIEF DESCRIPTION OF THE DRAWINGS

One or more embodiments are described as examples with reference to the corresponding figures in the accompanying drawings, and the examples do not constitute a limitation on the embodiments. Elements with the same reference numerals in the accompanying drawings represent similar elements. The figures in the accompanying drawings do not constitute a proportion limitation unless otherwise stated.

DETAILED DESCRIPTION

In order to make objectives, technical solutions and advantages of the present disclosure clearer, some embodiments of the present disclosure will be explained below in detail with reference to accompanying drawings and embodiments. It should be understood that specific embodiments described here only explain the disclosure but do not constitute a limitation on the disclosure.

The inventor found that in a new type of active stylus touch system, theoretically, a touch screen may communicate with an active stylus by transmitting a DSSS signal to realize a synchronization between a screen terminal and a stylus terminal, a sending of commands and other operations. However, there is no report in the industry of touch screen and active stylus about this technology. The application environment of the active stylus is very complex, and there are many interference problems such as charger interference, power grid conduction interference, white noise interference and the like. In the active stylus touch system, it has become a difficulty in technology industrialization that how to use the DSSS signal to realize the synchronization between the screen terminal and the stylus terminal, the sending of commands and other operations to ensure that the active stylus can be used normally in various environments. Herein, when the active stylus receives the DSSS signal, how to improve sensitivity and enhance anti-interference ability becomes a key.

Figure 1:
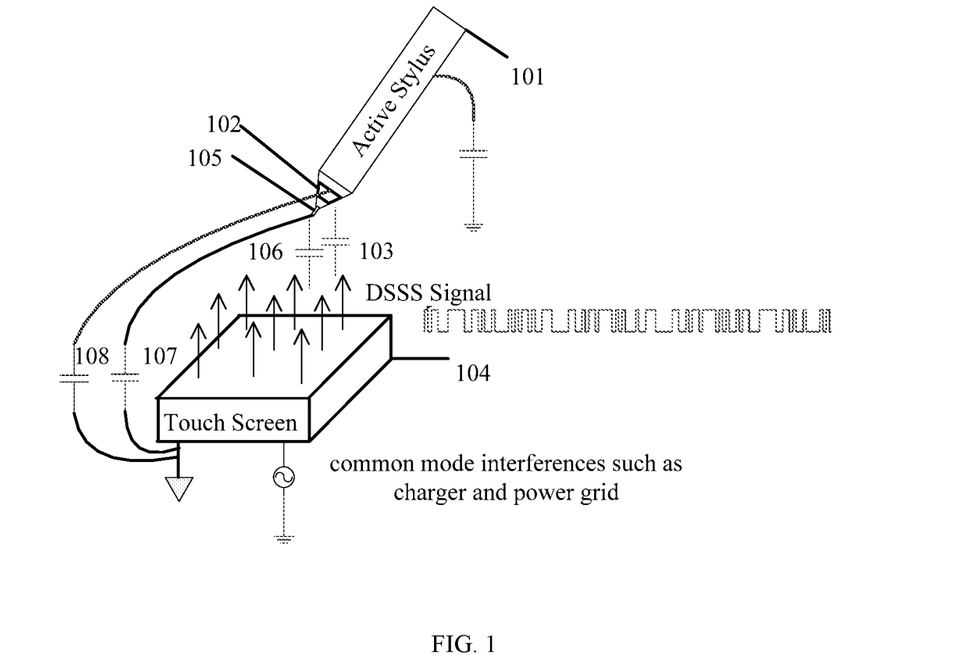
FIG. 1 is a schematic diagram of a signal processing system applied to an active stylus and a touch screen in an embodiment of the present disclosure.

FIG. 1 shows an application scenario of a signal processing system in the present disclosure. Referring to FIG. 1, a touch screen 104 may form a coupling capacitance with a stylus tip electrode of an active stylus 101. When the active stylus 101 contacts or approaches the touch screen 104, a sensor electrode of the touch screen 104 may form a coupling capacitance with the stylus tip electrode of the active stylus 101. Herein, the sensor electrode includes a transmitting electrode (TX electrode, also referred as a driving electrode) and/or a receiving electrode (RX electrode). A DSSS signal is transmitted through the sensor electrode, and the active stylus receives the DSSS signal through the coupling capacitance formed between the touch screen and the active stylus. The active stylus demodulates the received DSSS signal through the signal processing system, so as to realize synchronization between a screen terminal and a stylus terminal, a sending of commands and other operations.

Specifically, a transmission data may be spread spectrum-encoded by a touch chip in the touch screen to generate the DSSS signal. The DSSS signal generated by the touch chip is transmitted to the active stylus through the sensor electrode of the touch screen, and the active stylus uses the coupling capacitance to receive the DSSS signal transmitted from the touch screen. Herein, the DSSS signal generated by the touch chip include an information to be synchronized and an information to be demodulated, where the information to be synchronized includes a DSSS signal transmitted from the touch screen at a specific time point T, and the information to be demodulated includes a code ID of the touch screen. The touch screen needs a specific coding signal transmitted from the active stylus, and the specific coding signal may include a pressure of the active stylus, shaking information of the active stylus, a response signal of the active stylus and the like. In the embodiment of the present disclosure, the coupling capacitance formed between the active stylus and the touch screen may be a coupling capacitance shown in FIG. 1. As shown in FIG. 1, the active stylus 101 includes a primary electrode 105 and a secondary electrode 102. The coupling capacitance formed between the active stylus 101 and the touch screen 104 may be a coupling capacitance 106 formed between the primary electrode 105 and the touch screen 104 or a coupling capacitance 103 formed between the secondary electrode 102 and the touch screen 104. The active stylus 101 may receive the DSSS signal through the coupling capacitance 106 or through the coupling capacitance 103. However, there are common mode interferences such as charger and power grid in the touch screen. The common mode interference may be coupled to a ground (GND) of the touch screen, so that this touch screen system may have this common mode interference. The common mode interference may be transmitted to the active stylus through a signal coupling path. For example, the common mode interference may be transmitted to the active stylus through a coupling capacitance 107 between the GND of the touch screen and the primary electrode 105 of the active stylus, or through a coupling capacitance 108 between the GND of the touch screen and the secondary electrode 102 of the active stylus. That is, the common mode interference of the touch screen may be received by the active stylus. Therefore, when the active stylus receives the DSSS signal, high sensitivity and strong anti-interference ability become a key point.

Figure 2:
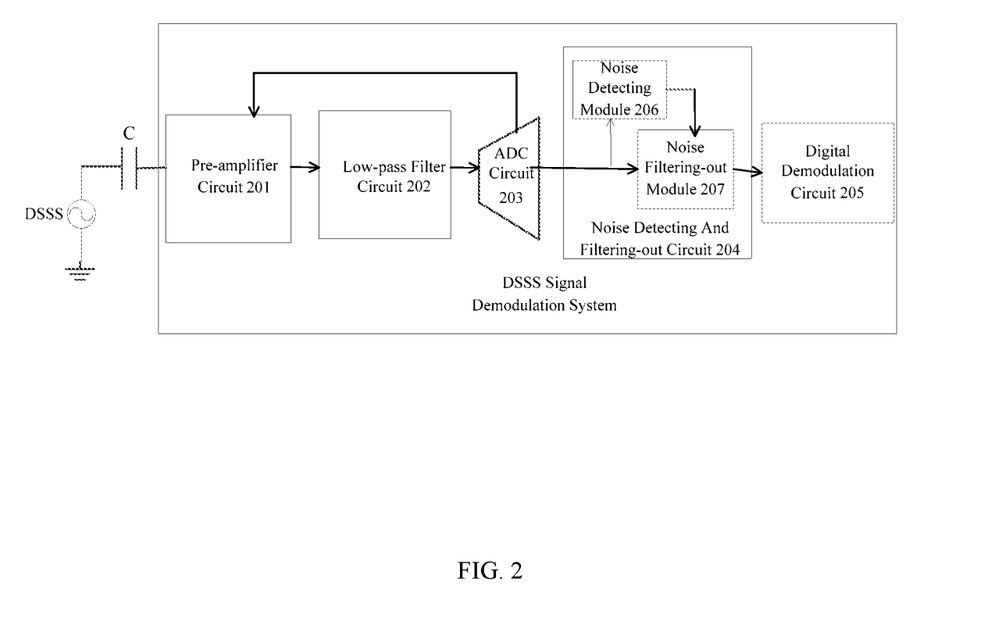
FIG. 2 is a schematic diagram of a signal processing system in an embodiment of the present disclosure.

The present disclosure provides a new type of DSSS signal demodulation system applicable to an active stylus. The DSSS signal demodulation system enables the active stylus to have high sensitivity and strong anti-interference ability when receiving a DSSS signal. Specifically, refer to FIG. 2, which is a schematic diagram of a signal processing system in an embodiment of the present disclosure. In FIG. 2, the active stylus receives the DSSS signal through a coupling capacitance C. The DSSS signal is input to the DSSS signal demodulation system in the active stylus through the coupling capacitance C. The DSSS signal demodulation system demodulates the received DSSS signal to restore a transmission data. Herein, the DSSS signal demodulation system includes a pre-amplifier circuit 201, a low-pass filter circuit 202, an analog-to-digital converter (ADC) circuit 203, a noise detecting and filtering-out circuit 204 and a digital demodulation circuit 205. Herein, the pre-amplifier circuit 201 may be a trans-impedance amplifier (TIA) circuit, and the low-pass filter circuit 202 may be an anti-alias filter (AAF) circuit. The pre-amplifier circuit 201 pre-amplifies the received DSSS signal and inputs a pre-amplified DSSS signal to the low-pass filter circuit 202. The low-pass filter circuit 202 filters the pre-amplified DSSS signal and inputs a filtered DSSS signal to the ADC circuit 203. The ADC circuit 203 samples the filtered DSSS signal and inputs a sampled DSSS signal to the noise detecting and filtering-out circuit 204. The noise detecting and filtering-out circuit 204 performs a noise analysis on a sampled data, and may filter out a noise signal after monitoring the noise signal, so as to achieve the purpose of strong anti-interference. The noise detecting and filtering-out circuit 204 inputs a noise-filtered DSSS signal to the digital demodulation circuit 205. The digital demodulation circuit 205 demodulates the noise-filtered DSSS signal for specific coding information of the DSSS signal to restore the transmission data.

The active stylus pre-amplifies the DSSS signal through the pre-amplifier circuit 201, and controls a gain of the pre-amplifier circuit 201 to be amplified or reduced according to the sampled signal output by the ADC circuit 203, so as to automatically control the gain and adapt to different application scenarios. Specifically, when the active stylus is far away from the touch screen or the active stylus is adjacent to an edge of the touch screen, the active stylus monitors that an amplitude of the sampled signal output from the ADC circuit 203 is smaller than a first threshold, and controls the pre-amplifier circuit 201 to amplify the gain. At this time, the active stylus is easier to detect a useful signal, thus the active stylus has higher sensitivity, so that when the active stylus is far away from the touch screen or the active stylus is adjacent to the edge of the touch screen, a signal even with small amplitude may be received and recognized by the active stylus. When there is large noise interference in the external environment, the circuit is saturated and distorted, the active stylus monitors that the amplitude of the sampled signal output from the ADC circuit is greater than a second threshold, and controls the pre-amplifier circuit to reduce the gain, thus preventing the ADC circuit from being saturated, avoiding a signal distortion and improving an anti-interference ability of the DSSS signal demodulation system. Preferably, the first threshold may be smaller than the second threshold.

The present disclosure provides a signal processing system, which may be applied to an active stylus. When the signal processing system receives a DSSS signal, the signal processing system can have strong anti-interference ability by a noise detecting and filtering-out circuit, and can adapt to different application scenarios and have high sensitivity by automatically controlling a gain of a pre-amplifier circuit.

Figure 3:
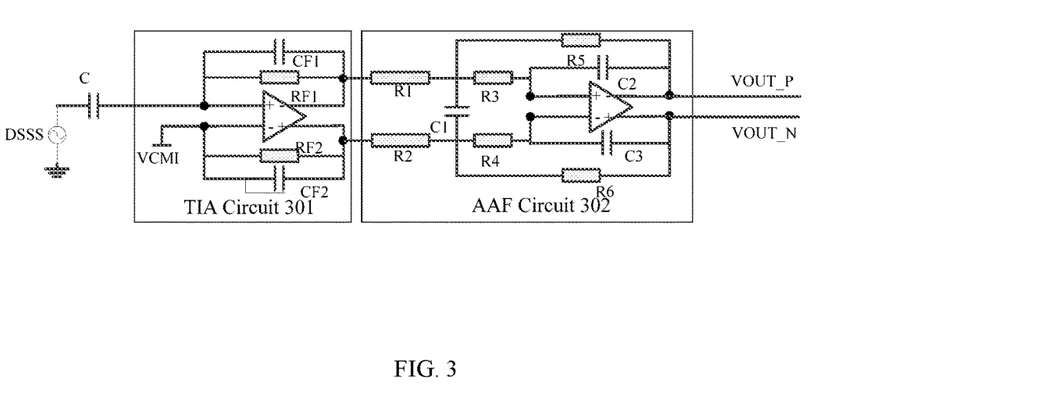
FIG. 3 is a schematic diagram of some circuits of a signal processing system in an embodiment of the present disclosure.

Specifically, the pre-amplifier circuit 201 may be a TIA circuit 301. This embodiment takes the TIA circuit 301 as an example for description. Referring to FIG. 3, the TIA circuit 301 includes an amplifier, a feedback capacitor CF1, a feedback resistor RF1, a feedback capacitor CF2 and a feedback resistor RF2. Herein, a positive input terminal of the amplifier receives the DSSS signal through a coupling capacitance, and a negative input terminal of the amplifier is connected with a reference voltage VCMI. One end of the feedback capacitor CF1 is connected with the positive input terminal of the amplifier, and the other end of the feedback capacitor CF1 is connected with a reverse output terminal of the amplifier. One end of the feedback resistor RF1 is connected with the positive input terminal of the amplifier, the other end of the feedback resistor RF1 is connected with the reverse output terminal of the amplifier and the other end of the feedback capacitor CF1. One end of the feedback capacitor CF2 is connected with a reverse input terminal of the amplifier, and the other end of the feedback capacitor CF2 is connected with a positive output terminal of the amplifier. One end of the feedback resistor RF2 is connected with the reverse input terminal of the amplifier, and the other end of the feedback resistor RF2 is connected with the positive output terminal of the amplifier and the other end of the feedback capacitor CF2. The positive output terminal and the reverse output terminal of the amplifier serve as the output terminal of the TIA circuit 301. When the active stylus monitors that a signal amplitude of the sampled signal output from a ADC circuit is less than a first threshold, a resistance of the feedback resistor RF1 and a resistance of the feedback resistor RF2 are increased, to increase a gain of the TIA circuit 301, which enables the active stylus to easier detect a useful signal and improves a detection sensitivity of the active stylus. When the active stylus monitors that the signal amplitude of the sampled signal output from the ADC circuit is greater than a second threshold, the resistance of the feedback resistor RF1 and the resistance of the feedback resistor RF2 are decreased, to reduce the gain of the TIA circuit 301, so that the ADC circuit is prevented from being saturated and the signal may not be distorted. The active stylus controls the gain of the TIA circuit 301 by detecting a magnitude of the signal amplitude of the sampled signal output from the ADC circuit, which enables the active stylus to adapt to different application scenarios and have high sensitivity.

In practical applications, the pre-amplifier circuit 201 may be the TIA circuit 301 or other amplifier circuits. The present disclosure does not constitute a limitation to the specific circuit structure of the pre-amplifier circuit.

Specifically, the low-pass filter circuit 202 may be an AAF circuit 302. This embodiment takes the AAF circuit 302 as an example for description. Referring to FIG. 3, the AAF circuit includes an amplifier, a resistor R1, a resistor R2, a resistor R3, a resistor R4, a resistor R5, a resistor R6, a capacitor C1, a capacitor C2, and a capacitor C3. Herein, one end of the resistor R1 is connected with the reverse output terminal of the amplifier of the TIA circuit 301, the other end of the resistor R1 is connected with one end of R3, one end of R5 and one end of C1. The other end of R3 is connected with one end of C2 and a positive input terminal of the amplifier. The other end of R5 and the other end of C2 are connected with a reverse output terminal of the amplifier. One end of the resistor R2 is connected with a positive output terminal of the amplifier of the TIA circuit 301, and the other end of the resistor R2 is connected with one end of R4, one end of R6 and one end of C1. The other end of R4 is connected with one end of C3 and the reverse input terminal of the amplifier. The other end of R6 and the other end of C3 are connected with the positive output terminal of the amplifier. The reverse output terminal VOUT_P and positive VOUT_N of the amplifier serve as output terminals of the AAF circuit. The main function of the AAF circuit 302 is to filter out high-frequency interference signals and play an anti-alias role.

In practical applications, the low-pass filter circuit 202 may be the AAF circuit 302, or other types of low-pass filter circuits. The present disclosure does not constitute a limitation to the specific circuit structure of the pre-amplifier circuit.

Figure 4:
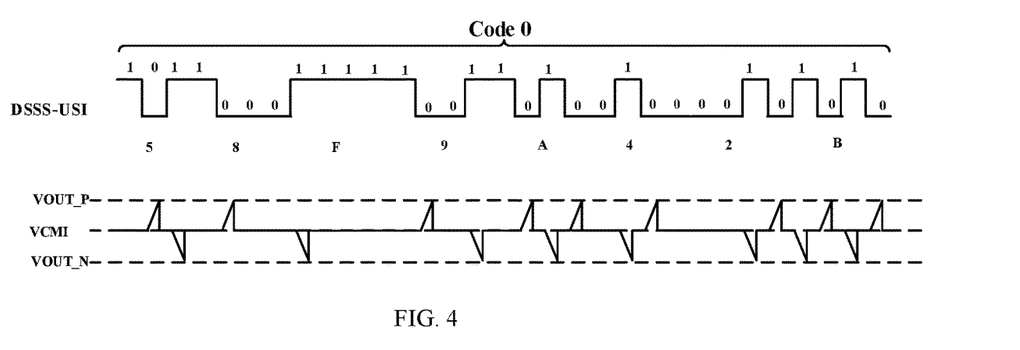
FIG. 4 is an input and output waveform diagram of a low-pass filter in an embodiment of the present disclosure.

An input and output waveform diagram of the AAF circuit 302 may be as shown in FIG. 4. The input is a DSSS code signal in a USI protocol. Taking a code 0 as an example, VOUT_P is a positive output amplitude of an amplified signal, VOUT_N is a negative output amplitude of the amplified signal, and a voltage common mode input (VCMI) is the common mode input voltage. The output amplitude may be controlled by configuring parameters of the resistors and the capacitors in the diagram.

Figure 5:
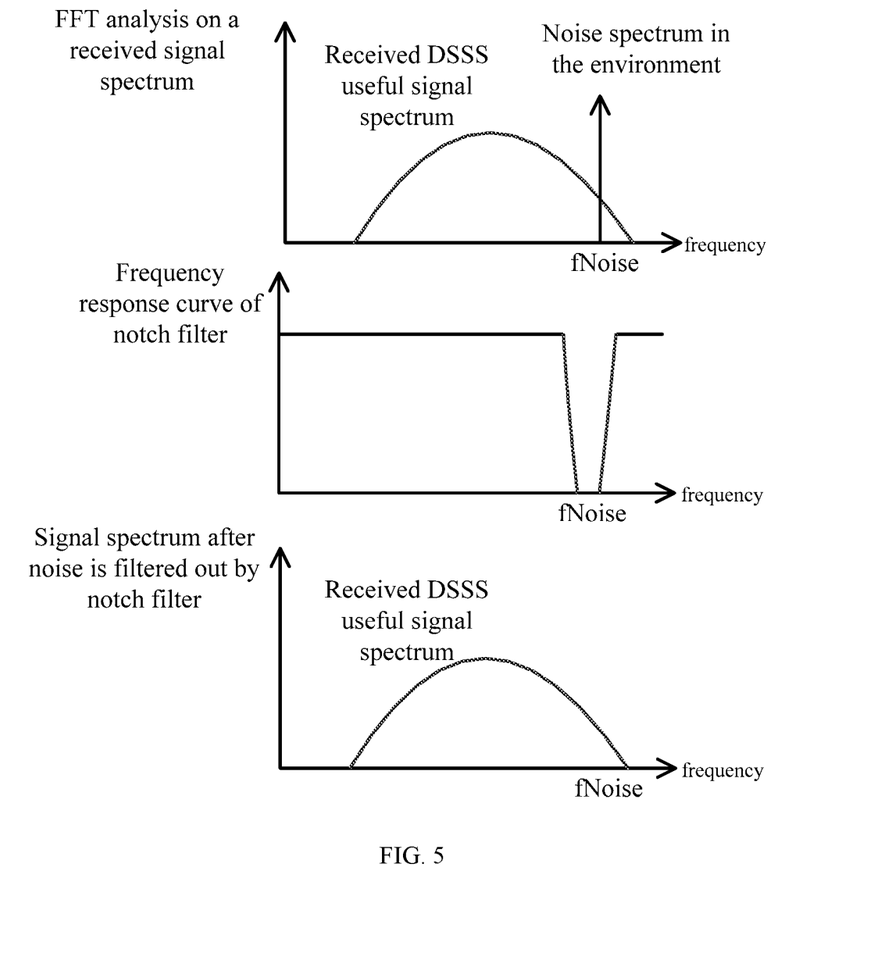
FIG. 5 is a schematic diagram of a noise detecting and filtering-out circuit filtering out a noise interference in an embodiment of the present disclosure.

The noise detecting and filtering-out circuit 204 includes a noise detecting module 206 and a noise filtering-out module 207. An output terminal of the noise detecting module 206 is connected with an input terminal of the noise filtering-out module 207. An output terminal of the noise filtering-out module 207 serves as an output terminal of the noise detecting and filtering-out circuit 204 and is connected with an input terminal of the digital demodulation circuit 205. The main function of the noise detecting module is to monitor whether there is a noise interference signal in the sampled signal output from the ADC circuit 203. An implementation manner of detecting the noise interference is to perform a fast Fourier transform (FFT) analysis on the sampled signal output from the ADC circuit 203. Referring to FIG. 5, the noise detecting module may monitor the useful signal and other noise interference signals. The noise detecting module may obtain a DSSS useful signal spectrum and a noise interference spectrum in the environment by performing the FFT analysis on a received DSSS signal energy spectrum. If there is the noise interference signal, the noise detecting module may monitor a frequency and amplitude of the noise interference signal. The main function of the noise filtering-out module is to filter out the noise interference signals monitored by the noise detecting module, and the noise filtering-out module may be a notch filter. When a large interference is monitored, the noise filtering-out module is set, such as setting a notch band of the notch filter as the noise interference frequency monitored by the noise detecting module, which may filter out the strong noise interference signal. The digital demodulation circuit demodulates the DSSS signal output from the noise detecting and filtering-out circuit. The signal processing system may have strong anti-interference ability by the noise detecting and filtering-out circuit and by automatically controlling the gain of the pre-amplifier circuit.

Figure 6:
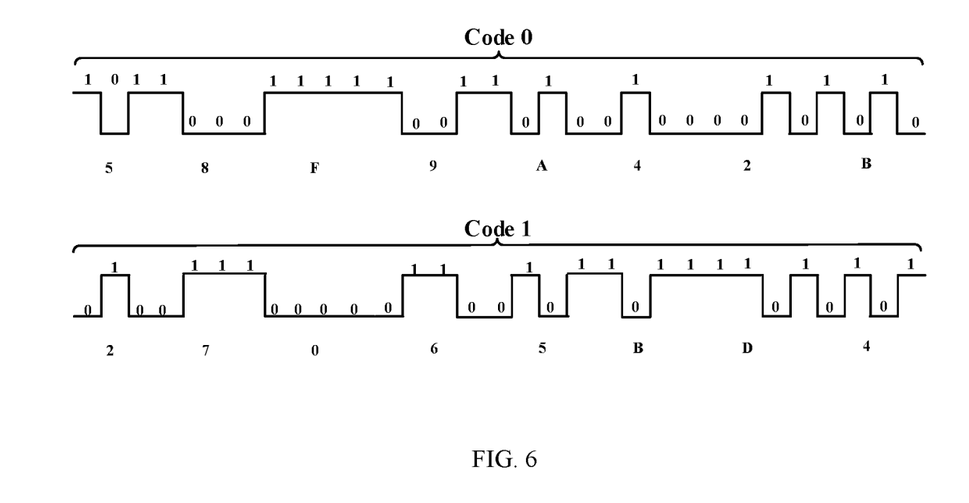
FIG. 6 is a waveform diagram of a spread-spectrum code of a transmission data of a touch screen in an embodiment of the present disclosure.

In this embodiment, a touch screen performs a spread spectrum-coding on the transmission data to generate the DSSS signal. The touch screen may adopt a DSSS spread spectrum-coding form of "0" and "1" in a universal serial interface (USI) protocol to perform the spread spectrum-coding on the DSSS signal. As shown in FIG. 6, "0" is represented by 31-bit code 0x58F9A42B, and "1" is represented by 31-bit code 0x27065BD4, and a duration of each bit is 1 us. In this embodiment, the DSSS signal code of the USI protocol is merely taken as an example, but it is not limited to this spread spectrum code in practical applications.

Figure 7:
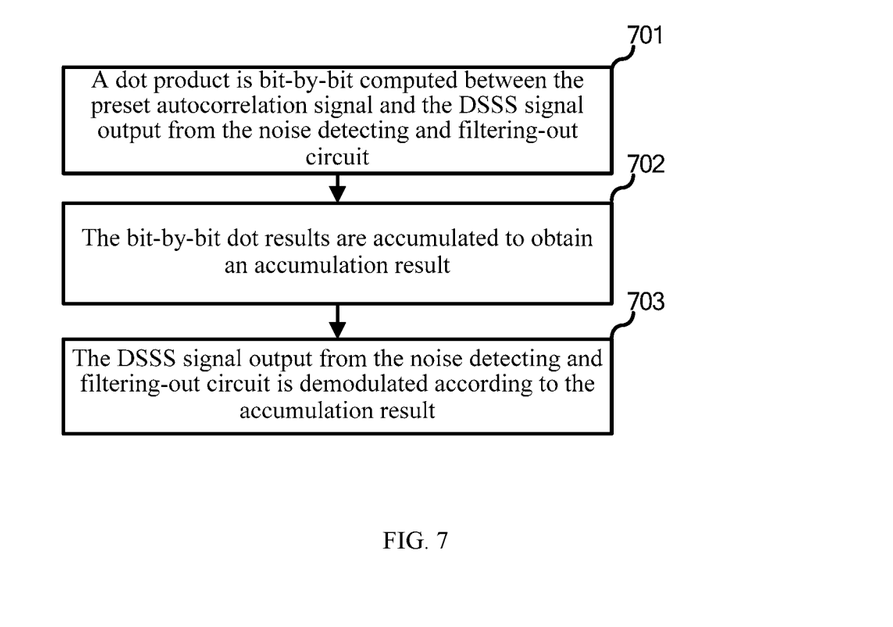
FIG. 7 is a flow chart of a digital demodulation circuit demodulating a signal in an embodiment of the present disclosure.

The digital demodulation circuit 205 includes a preset autocorrelation signal, and processes the preset autocorrelation signal and the DSSS signal output from the noise detecting and filtering-out circuit to obtain a demodulated signal. Referring to FIG. 7, the processing the preset autocorrelation signal and the DSSS signal output from the noise detecting and filtering-out circuit to obtain the demodulated signal specifically includes:

In S701, a dot product is bit-by-bit computed between the preset autocorrelation signal and the DSSS signal output from the noise detecting and filtering-out circuit.

In S702, the bit-by-bit dot product results are accumulated to obtain an accumulation result.

In S703, the DSSS signal output from the noise detecting and filtering-out circuit is demodulated according to the accumulation result.

In S701, a dot product is bit-by-bit computed between the preset autocorrelation signal and the DSSS signal output from the noise detecting and filtering-out circuit.

Figure 8:
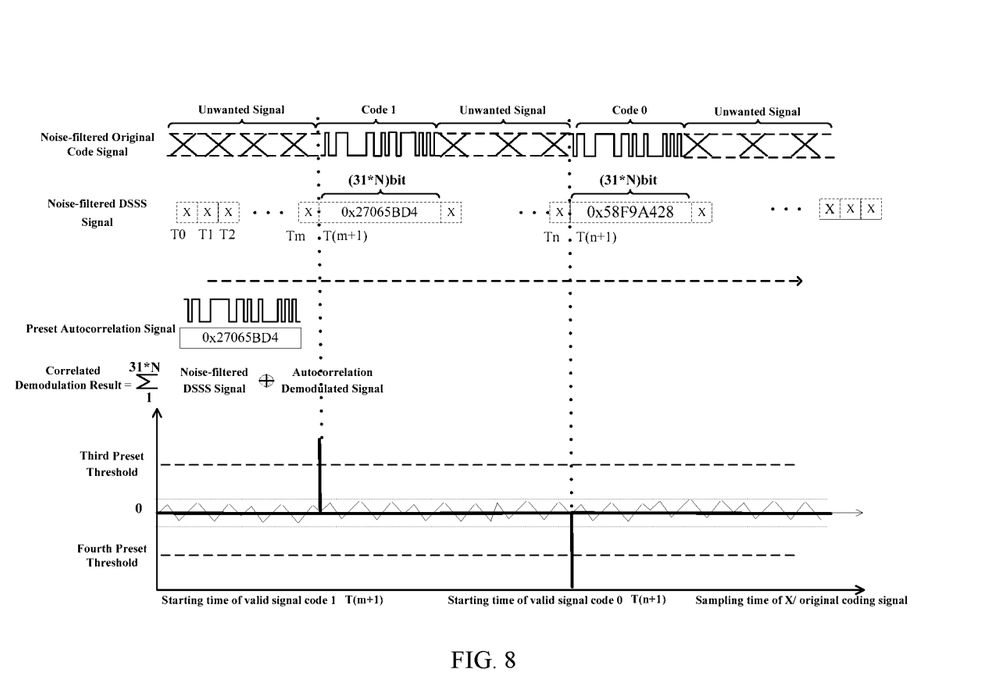
FIG. 8 is a schematic diagram of performing dot product between a DSSS signal output by a noise detecting and filtering-out circuit and a preset autocorrelation signal bit-by-bit and accumulating a dot product result to recognize a valid signal code in an embodiment of the present disclosure.

The DSSS signal output from the noise detecting and filtering-out circuit includes a first type of signal, a second type of signal and a third type of signal. The first type of signal is the spread spectrum code 0x27065BD4 corresponding to "1" in transmission data, the second type of signal is the spread spectrum code 0x58F9A428 corresponding to "0" in transmission data, and the third type of signal is an unwanted signal. The preset autocorrelation signal is a piece of data with a fixed length. Specifically, the preset autocorrelation signal is B bits, and after the digital demodulation circuit collects a B-bit DSSS signal output from the noise detecting and filtering-out circuit, the collected B-bit DSSS signal may perform bit-by-bit dot product with the corresponding B-bit preset autocorrelation signal. The preset autocorrelation signal is shifted backward as a whole by one bit on a time axis. Herein, B is the number of bits of the preset autocorrelation signal. For example, the preset autocorrelation signal is 10 bits, the digital demodulation circuit performs dot product bit-by-bit between the collected 1-10 bits of signals with 1-10 bits of the preset autocorrelation signal respectively. A autocorrelation demodulation module collects a 11th bit of the DSSS signal, and the preset autocorrelation signal is shifted backward as a whole by 1 bit on the time axis, that is, the digital demodulation circuit performs dot product bit-by-bit between the collected 2-11 bits signal with the 1-10 bits of the preset autocorrelation signal respectively, and so on. The preset autocorrelation signal may be the first type of signal or the second type of signal. In this embodiment, the preset autocorrelation signal takes the first type of signal as an example. As shown in FIG. 8, the waveform diagram of the preset autocorrelation signal is the waveform diagram of "Code 1". According to DSSS signal characteristics of the USI protocol, "0" or "1" is encoded with 31-bit data, and each bit has a duration of 1 us, so the number of points obtained by sampling each bit is N, so that the preset autocorrelation signal is stored in a 31*N wave table. As each sampling point is sampled, the preset autocorrelation signal is bitwise shifted. The above operation is repeated, and the dot product is computed bit-by-bit between the DSSS signal output from the noise detecting and filtering-out circuit and the preset autocorrelation signal.

In S702, the bit-by-bit dot product results are accumulated to obtain the accumulation result.

Specifically, the bit-by-bit dot product results of the B-bit DSSS signal output from the noise detecting and filtering-out circuit and the B-bit preset autocorrelation signal may be accumulated to obtain the accumulation result.

In S703, the noise-filtered DSSS signal is demodulated according to the accumulation result.

Specifically, the noise-filtered DSSS signal may be demodulated by comparing the accumulation result with a preset threshold respectively. The preset threshold may include a third threshold and a fourth threshold, and the third threshold is greater than the fourth threshold. In practical applications, the third threshold Threshold_H may be a natural number greater than 0. The fourth threshold Threshold_L may be a natural number less than 0. Further, when the accumulation result is greater than the third threshold Threshold_H, the B-bit DSSS signal output from the noise detecting and filtering-out circuit is recognized as the first type of signal, that is, a code signal "1", which corresponds to a time point after the touch screen transmits the code signal "1". When the accumulation result is less than the fourth threshold Threshold_L, the B-bit DSSS signal output from the noise detecting and filtering-out circuit is recognized as the second type of signal, that is, a code signal "0", which corresponds to a time point after the touch screen transmits the code signal "0". The code signal "0" and the code signal "1" are useful signals. When the accumulation result is greater than the fourth threshold Threshold_L and less than the third threshold Threshold_H, the B-bit DSSS signal output from the noise detecting and filtering-out circuit is recognized as the unwanted signal, which corresponds to that the screen terminal does not transmit the DSSS signal at this time, and this time is an unwanted signal time.

Referring to FIG. 8, the dot product is computed bit-by-bit between the noise-filtered DSSS signal and the preset autocorrelation signal, and the bit-by-bit dot product results are accumulated to obtain the accumulation result. By comparing the accumulation result with the preset thresholds respectively, the DSSS signal output from the noise detecting and filtering-out circuit is demodulated. The third threshold is a natural number greater than 0, and the fourth threshold is a natural number less than 0. Further, when the accumulation result is greater than the third threshold, the B-bit DSSS signal output from the noise detecting and filtering-out circuit is recognized as the first type of signal, that is, "starting time Tm+1 of a valid signal code 1" marked in FIG. 8, which corresponds to the time after the touch screen transmits the code signal "1". When the accumulation result is less than the fourth threshold Threshold_L, the B-bit DSSS signal output from the noise detecting and filtering-out circuit is recognized as the second type of signal, that is, "starting time Tn+1 of a valid signal code 0" marked in FIG. 8, which corresponds to the time after the touch screen transmits the code signal "0". When the accumulation result is greater than the fourth threshold Threshold_L and less than the third threshold Threshold_H, the B-bit DSSS signal output from the noise detecting and filtering-out circuit is recognized as the unwanted signal, which corresponds to that the screen terminal does not transmit the DSSS signal at this time, and this time is the unwanted signal time. It can be seen from FIG. 8 that the unwanted signals are sampled at time T0, T1, T2, Tm and Tn, the code 1 is sampled at time Tm+1, the code 0 is sampled at time Tn+1, and a relevant demodulated signal is obtained by the digital demodulation circuit. The correlated demodulated signal is a demodulated signal of a DSSS signal generated by a touch chip. The DSSS signal generated by the touch chip includes information to be synchronized and information to be demodulated, and the demodulated signal includes synchronization information and demodulation information. Herein, the synchronization information includes the DSSS signal transmitted from the touch screen at a specific time point T, and the demodulation information includes a code ID of the touch screen. The touch screen requires a specific coding signal transmitted from the active stylus. The specific coding signal may include a pressure of the active stylus, shaking information of the active stylus, a response signal of the active stylus, and the like. In the present disclosure, the digital demodulation circuit may analyze the DSSS signal output from the noise detecting and filtering-out circuit, and may synchronize the DSSS signal, detect its starting time, and realize a timing synchronization between the touch screen and the active stylus, so as to better carry out information interaction between the touch screen and the active stylus.

Figure 9:
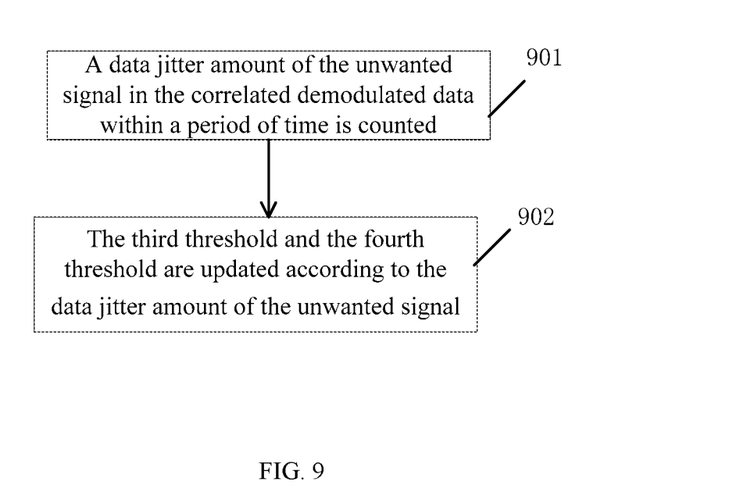
FIG. 9 is a flow chart of a digital demodulation circuit updating a threshold in an embodiment of the present disclosure.

Further, the digital demodulation circuit may update the third Threshold_H and the fourth Threshold_L according to different application scenarios, so that each segment of the DSSS signal may be analyzed more accurately. The digital demodulation circuit includes a threshold setting module. The threshold setting module is configured to calculate a value of the noise signal and update the third threshold and the fourth threshold according to the value of the noise signal. The noise signal is the unwanted signal. Referring to FIG. 9, specifically, the digital demodulation circuit collects the data of the unwanted signal, including the following steps:

In S901, a data jitter amount of the unwanted signal in the correlated demodulated signal within a period of time is counted.

In S902, the third threshold and the fourth threshold are updated according to the data jitter amount of the unwanted signal.

In S901, a threshold setting module is turned on, and the data jitter amount of the unwanted signals in the correlated demodulated signal within a period of time is counted.

In S902, the threshold setting module updates the third threshold and the fourth threshold according to the data jitter amount of the unwanted signal, and the specific formulas are: Threshold_H=3*$\sigma$, Threshold_L=−3*$\sigma$, where Threshold_H is the third threshold, Threshold_L is the fourth threshold, and $\sigma$ is the value of the noise signal.

Figure 10:
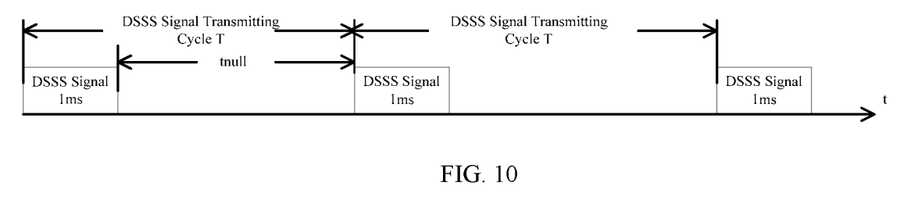
FIG. 10 is a schematic diagram of a touch screen periodically transmitting a DSSS signal in an embodiment of the present disclosure.

FIG. 10 is a schematic diagram of the touch screen terminal periodically transmitting the DSSS signal. The DSSS signal transmitting cycle T includes a time period of the DSSS signal and a tnull time period, The tnull time period is the time period for transmitting the unwanted signal. In the tnull time period, the threshold setting module may update the third threshold and the fourth threshold according to the data jitter amount of the unwanted signal, so as to better adapt to different application scenarios and identify the useful signal and unwanted signal more accurately.

In the present disclosure, the formula for updating the third threshold and the fourth threshold by the threshold setting module according to the data jitter amount of the unwanted signal is not limited to Threshold_H=3*$\sigma$ and Threshold_L=−3*$\sigma$. Other formulas may also be set. The present disclosure does not constitute a limitation to the specific formula for updating the third threshold and the fourth threshold according to the data jitter amount of the unwanted signal.

When the application scenario changes, the gain of the ADC circuit is controlled to increase or decrease by detecting the amplitude of the signal output from the ADC circuit, thereby improving the sensitivity of receiving the DSSS signal for the active stylus. By setting a noise detecting and filtering-out module, the active stylus may filter the common mode interference of the touch screen when receiving the DSSS signal, thereby improving an anti-interference ability of receiving the DSSS signal for the active stylus. When the noise changes greatly, the threshold setting module may be turned on to make a new threshold more suitable for the environment, which can improve the accuracy of the demodulated signal and identify the unwanted signal and the useful signal more accurately.

Compared with the existing technology, in this embodiment, the digital demodulation circuit may demodulate the DSSS signal output from the noise detecting and filtering-out circuit, and may synchronize the DSSS signal, detect its starting time, and realize the timing synchronization between the touch screen and the active stylus, so as to better carry out the information interaction between the touch screen and the active stylus.

Figure 11:
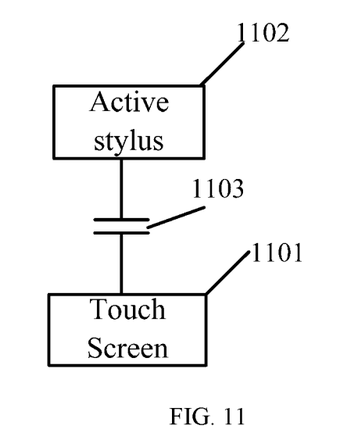
FIG. 11 is a schematic diagram of a signal processing system in an embodiment of the present disclosure.

The present disclosure provides a DSSS signal transmission manner, as shown in FIG. 11, including a touch screen 1101 and an active stylus 1102. The touch screen 1101 is configured to perform a spread spectrum coding on a transmission data to generate a DSSS signal. The touch screen 1101 is further configured to transmit the DSSS signal to the active stylus 1102 through a coupling capacitance 1103 formed between the touch screen 1101 and the active stylus 1102. The active stylus 1102 is configured to demodulate a received DSSS signal to obtain a demodulated signal, which is the transmission data. In an embodiment of the present disclosure, the DSSS signal is transmitted through the coupling capacitance formed between the active stylus and the touch screen, which can be well applied to a transmission of the DSSS signal in a touch system, and can further meet the strict requirements of the active stylus on structure, size and power consumption.

Figure 12:
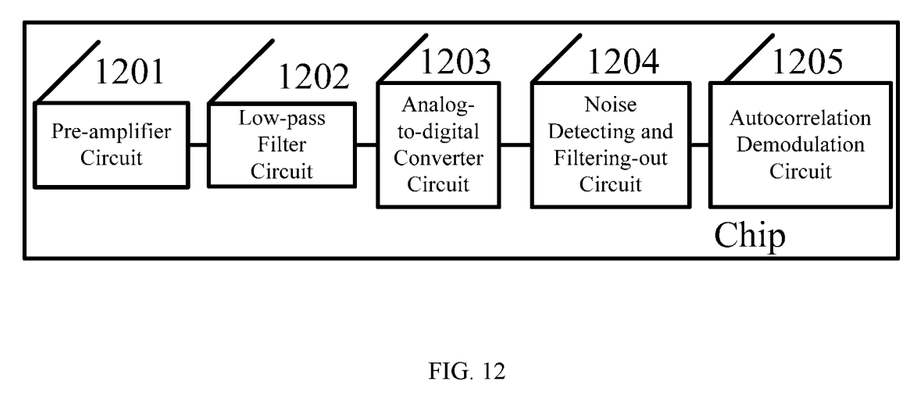
FIG. 12 is a schematic diagram of a chip in an embodiment of the present disclosure.

The present disclosure further provides a chip, as shown in FIG. 12, including a pre-amplifier circuit 1201, configured to pre-amplify a DSSS signal transmitted from a touch screen and received through a coupling capacitance formed between an active stylus and the touch screen. Herein, the DSSS signal transmitted from the touch screen is a DSSS signal generated by performing a spread spectrum coding on a transmission data by a touch chip. The DSSS signal generated by the touch chip includes information to be synchronized and information to be demodulated. The information to be synchronized includes a DSSS signal transmitted from the touch screen at a specific time T, and the information to be demodulated includes a code ID of the touch screen. The touch screen requires a specific coding signal transmitted from the active stylus and the specific coding signal may include a pressure of the active stylus, shaking information of the active stylus, a response signal of the active stylus and the like. The pre-amplifier circuit 1201 outputs the pre-amplified DSSS signal to a low-pass filter circuit 1202. The low-pass filter circuit 1202 is configured to filter the pre-amplified DSSS signal and output a filtered DSSS signal to an analog-to-digital converter circuit 1203. The analog-to-digital converter circuit 1203 is configured to sample the filtered DSSS signal and output a sampled DSSS signal to a noise detecting and filtering-out circuit 1204. The noise detecting and filtering-out circuit 1204 is configured to filter out a noise in the sampled DSSS signal and output a noise-filtered DSSS signal to a digital demodulation circuit 1205. The digital demodulation circuit 1205 is configured to demodulate the noise-filtered DSSS signal to obtain a correlated demodulated signal, and the correlated demodulated signal is a restored transmission data. The correlated demodulated signal includes synchronization information and demodulation information. Herein, the synchronization information includes the DSSS signal transmitted from the touch screen at the specific time T, and the demodulation information includes the code ID of the touch screen. The touch screen requires the specific coding signal transmitted from the active stylus. The specific coding signal may include the pressure of the active stylus, the shaking information of the active stylus, the response signal of the active stylus, and the like.

The active stylus pre-amplifies the DSSS signal through the pre-amplifier circuit 201, and controls a gain of the pre-amplifier circuit 201 to be increased or reduced according to the sampled signal output from the ADC circuit 203, so as to automatically control the gain and adapt to different application scenarios. Specifically, when the active stylus is far away from the touch screen or the active stylus is adjacent to an edge of the touch screen, the active stylus monitors that amplitude of the sampled signal output from the ADC circuit 203 is smaller than a first threshold, and controls the pre-amplifier circuit 201 to amplify the gain. At this time, the active stylus is easier to detect a useful signal, thus the active stylus has higher sensitivity, so that when the active stylus is far away from the touch screen or the active stylus is adjacent to the edge of the touch screen, a signal even with small amplitude may be received and recognized by the active stylus. When there is a large noise interference in the external environment, the circuit is saturated and distorted. The active stylus monitors that the amplitude of the sampled signal output from the ADC circuit is greater than a second threshold, and controls the pre-amplifier circuit to reduce the gain, thus preventing the ADC circuit from saturation, avoiding a signal distortion and improving an anti-interference ability of the DSSS signal demodulation system. Preferably, the first threshold may be smaller than the second threshold.

Compared with the existing technology, in this embodiment, he DSSS signal is transmitted through the coupling capacitance formed between the active stylus and the touch screen, which may be well applied to the transmission of DSSS signal in the touch system. When a signal processing system provided by the present disclosure receives the DSSS signal, the signal processing system can have strong anti-interference ability by the noise detecting and filtering-out circuit and by automatically controlling the gain of the pre-amplifier circuit. Automatically controlling the gain of the pre-amplifier circuit can enable the signal processing system to adapt to different application scenarios and have high sensitivity. When the noise changes greatly, a threshold setting module may be turned on to make a new threshold more suitable for the environment, which can improve the accuracy of the demodulated signal and identify an unwanted signal and a useful signal more accurately.

Figure 13:
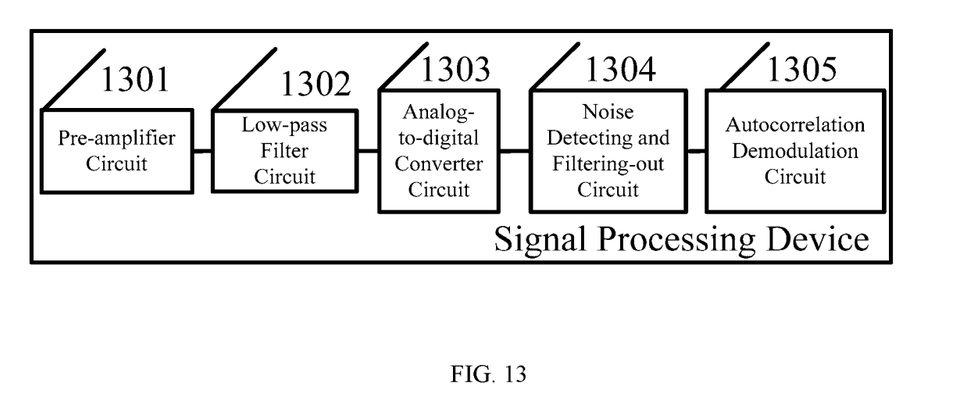
FIG. 13 is a schematic diagram of a signal processing device in an embodiment of the present disclosure.

The present disclosure further provides a signal processing device, as shown in FIG. 13, including a pre-amplifier circuit 1301, a low-pass filter circuit 1302, an analog-to-digital converter circuit 1303, a noise detecting and filtering-out circuit 1304 and a digital demodulation circuit 1305. The pre-amplifier circuit 1301 is configured to pre-amplify a received DSSS signal and output a pre-amplified DSSS signal. The pre-amplifier circuit 1301 outputs the pre-amplified DSSS signal to the low-pass filter circuit 1302. The low-pass filter circuit is configured to filter the pre-amplified DSSS signal and output a filtered DSSS signal to the analog-to-digital converter circuit 1303. The analog-to-digital converter circuit 1303 is configured to sample the filtered DSSS signal and output a sampled DSSS signal to the noise detecting and filtering-out circuit 1304. The noise detecting and filtering-out circuit 1304 is configured to filter out a noise in the sampled DSSS signal and output a noise-filtered DSSS signal to the digital demodulation circuit 1305. The digital demodulation circuit 1305 is configured to demodulate the noise-filtered DSSS signal to output a demodulated signal.

When the signal processing system provided by the present disclosure receives the DSSS signal, the signal processing system can have strong anti-interference ability by the noise detecting and filtering-out circuit and by automatically controlling the gain of the pre-amplifier circuit. Automatically controlling the gain of the pre-amplifier circuit can enable the signal processing system to adapt to different application scenarios and have high sensitivity, so as to realize a synchronization of a screen end and a stylus terminal, a sending of commands and other operations.

The steps set in the above-described methods only aim to make the description clearer. In implementation, the steps may be combined into one or one step may be divided into multiple steps, which all fall into the protection scope of the present disclosure as long as the same logical relationship is included. Such a trivial amendment or design added to an algorithm or procedure as not changing the algorithm or a central design of the procedure falls into the protection scope of the disclosure.

Similarly, although operations are described in a specific order in the accompanying drawings, it should not be understood as requiring these operations to be performed in the specific order shown or sequentially in the order, or requiring all the operations shown to be performed to achieve the desired results. Furthermore, the various separate system components in the embodiments described in this patent document should not be understood as requiring such separation in all embodiments.

This patent document only describes a few implementations and examples, and other implementations, enhancements and changes may be made based on the content described and shown in this patent document.

Those skilled in the art may understand that all or some steps that realize the above-described embodiments may be performed by instructing related hardware through a program which may be stored in a computer-readable storage medium and which includes several instructions to enable a device (which may be a single-chip microcomputer, a chip, or the like) or a processor to perform all or part of the steps of the method described in each embodiment of the present disclosure. The aforementioned storage media include: a U disk, a mobile hard disk, a read-only memory (ROM), a random access memory (RAM), a magnetic disk or an optical disk and other medium that may store program codes.

Those skilled in the art should appreciate that the aforementioned embodiments are specific examples for implementing the present disclosure. In practice, however, many changes can be made in forms and details of the specific embodiments without departing from the spirit and the scope of the present disclosure.

What is claimed is:

1. A signal processing system, applied to an active stylus, comprising:
   a pre-amplifier circuit, configured to pre-amplify a received DSSS signal and output a pre-amplified DSSS signal;
   a low-pass filter circuit, configured to filter the pre-amplified DSSS signal and output a filtered DSSS signal;
   an analog-to-digital converter circuit, configured to sample the filtered DSSS signal and output a sampled DSSS signal;
   a noise detecting and filtering-out circuit, configured to filter out a noise signal in the sampled DSSS signal and output a noise-filtered DSSS signal; and
   a digital demodulation circuit, configured to demodulate the noise-filtered DSSS signal to output a demodulated signal, wherein
   the digital demodulation circuit is configured to process a preset autocorrelation signal and the noise-filtered DSSS signal to obtain the demodulated signal; and
   the digital demodulation circuit is further configured to:
   perform dot product bit-by-bit between the preset autocorrelation signal and the noise-filtered DSSS signal to obtain dot product results;
   accumulate the dot product results to obtain an accumulation result; and
   demodulate the noise-filtered DSSS signal according to the accumulation result to obtain the demodulated signal.

2. The signal processing system according to claim 1, wherein a gain of the pre-amplifier circuit is adaptively adjusted according to the sampled DSSS signal.

3. The signal processing system according to claim 2, wherein:
   in response to the sampled DSSS signal having an amplitude less than a first threshold, the gain of the pre-amplifier circuit is increased;
   in response to the sampled DSSS signal having an amplitude greater than a second threshold, the gain of the pre-amplifier circuit is reduced;
   wherein the second threshold is greater than the first threshold.

4. The signal processing system according to claim 1, wherein the low-pass filter circuit is an anti-alias filter circuit;
   wherein the pre-amplifier circuit is a trans-impedance amplifier circuit;
   wherein the noise detecting and filtering-out circuit comprises a noise detecting module and a noise filtering-out module.

5. The signal processing system according to claim 4, wherein the noise detecting module is configured to perform a fast Fourier transform analysis on the sampled DSSS signal to detect a frequency of the noise signal in the sampled DSSS signal.

6. The signal processing system according to claim 5, wherein the noise filtering-out module comprises a notch filter, and the noise filtering-out module is configured to filter out the noise signal according to the frequency of the noise signal detected by the noise detecting module, wherein a frequency of the notch filter is equal to the frequency of the noise signal.

7. The signal processing system according to claim 1, wherein the digital demodulation circuit is configured to perform dot product bit-by-bit between the preset autocorrelation signal and the noise-filtered DSSS signal to obtain the dot product results by:
   performing dot product bit-by-bit between a B-bit DSSS signal output from the noise detecting and filtering-out circuit and a B-bit preset autocorrelation signal, to obtain a corresponding dot product result, wherein B is a bit number of the preset autocorrelation signal.

8. The signal processing system according to claim 7, wherein the digital demodulation circuit is configured to accumulate the dot product results to obtain the accumulation result by:
   accumulating the dot product results bit by-bit between the B-bit DSSS signal output from the noise detecting and filtering-out circuit and the B-bit preset autocorrelation signal to obtain the accumulation result; and
   shifting the preset autocorrelation signal backward by 1 bit.

9. The signal processing system according to claim 8, wherein the digital demodulation circuit is configured to demodulate the noise-filtered DSSS signal according to the accumulation result to obtain the demodulated signal by:
   demodulating the noise-filtered DSSS signal according to a comparison result of the accumulation result and a preset threshold, to obtain the demodulated signal.

10. The signal processing system according to claim 9, wherein the digital demodulation circuit is configured to demodulate the noise-filtered DSSS signal according to the comparison result of the accumulation result and the preset threshold by:
    determining a data as a useful signal in response to the accumulation result being greater than a third threshold or smaller than a fourth threshold; and
    determining the data as an unwanted signal in response to the accumulation result being smaller than the third threshold and greater than the fourth threshold.

11. The signal processing system according to claim 10, wherein the useful signal comprises a first type of signal and a second type of signal, and determining the data as the useful signal in response to the accumulation result being greater than the third threshold or smaller than the fourth threshold comprises:
    identifying the B-bit DSSS signal output from the noise detecting and filtering-out circuit as the first type of signal in response to the accumulation result being greater than the third threshold;
    identifying the B-bit DSSS signal output from the noise detecting and filtering-out circuit as the second type of signal in response to the accumulation result being smaller than the fourth threshold; and
    the third threshold is greater than the fourth threshold.

12. The signal processing system according to claim 11, wherein after the B-bit DSSS signal output from the noise detecting and filtering-out circuit is identified as the first type of signal in response to the accumulation result being greater than the third threshold, the digital demodulation circuit is further configured to: take a starting time of collecting the B-bit DSSS signal output from the noise detecting and filtering-out circuit as a starting time of the identified first type of signal; and after the B-bit DSSS signal output from the noise detecting and filtering-out circuit is identified as the second type of signal in response to the accumulation result being smaller than the fourth threshold, the digital demodulation circuit is further configured to: take the starting time of collecting the B-bit DSSS signal output from the noise detecting and filtering-out circuit as a starting time of the identified second type of signal.

13. The signal processing system according to claim 10, wherein the digital demodulation circuit comprises a threshold setting module and the threshold setting module is configured to calculate a jitter value of the unwanted signal and update the third threshold and the fourth threshold according to the jitter value of the unwanted signal.

14. The signal processing system according to claim 13, wherein a formula for updating the third threshold and the fourth threshold by the threshold setting module according to the jitter value of the useless signal is:

$$Threshold\_H=3*\sigma, Threshold\_L=-3*\sigma$$

wherein Threshold_H is the third threshold, Threshold_L is the fourth threshold, and $\sigma$ is the jitter value of the unwanted signal.

15. The signal processing system according to claim 1, wherein the signal processing system is configured to receive a DSSS signal transmitted from a touch screen through a coupling capacitance formed between the active stylus and the touch screen.

16. The signal processing system according to claim 15, wherein the active stylus comprises a primary electrode and a secondary electrode, and the coupling capacitance formed between the active stylus and the touch screen is:

a coupling capacitance formed between the primary electrode and the touch screen, and/or a coupling capacitance formed between the secondary electrode and the touch screen.

17. A chip, comprising a signal processing system and applied to an active stylus, wherein the signal processing system comprises:

a pre-amplifier circuit, configured to pre-amplify a DSSS signal and output a pre-amplified DSSS signal;

a low-pass filter circuit, configured to filter the pre-amplified DSSS signal and output a filtered DSSS signal;

an analog-to-digital converter circuit, configured to sample the filtered DSSS signal and output a sampled DSSS signal;

a noise detecting and filtering-out circuit, configured to filter out a noise signal in the sampled DSSS signal and output a noise-filtered DSSS signal; and a digital demodulation circuit, configured to demodulate the noise-filtered DSSS signal to output a demodulated signal, wherein the digital demodulation circuit is configured to process a preset autocorrelation signal and the noise-filtered DSSS signal to obtain the demodulated signal; and the digital demodulation circuit is further configured to:

perform dot product bit-by-bit between the preset autocorrelation signal and the noise-filtered DSSS signal to obtain dot product results;

accumulate the dot product results to obtain an accumulation result; and demodulate the noise-filtered DSSS signal according to the accumulation result to obtain the demodulated signal.

18. An active stylus comprising a chip, wherein the chip comprises a signal processing system, and the signal processing system comprises:

a pre-amplifier circuit, configured to pre-amplify a received DSSS signal and output a pre-amplified DSSS signal;

a low-pass filter circuit, configured to filter the pre-amplified DSSS signal and output a filtered DSSS signal;

an analog-to-digital converter circuit, configured to sample the filtered DSSS signal and output a sampled DSSS signal;

a noise detecting and filtering-out circuit, configured to filter out a noise signal in the sampled DSSS signal and output a noise-filtered DSSS signal; and a digital demodulation circuit, configured to demodulate the noise-filtered DSSS signal to output a demodulated signal, wherein the digital demodulation circuit is configured to process a preset autocorrelation signal and the noise-filtered DSSS signal to obtain the demodulated signal; and the digital demodulation circuit is further configured to:

perform dot product bit-by-bit between the preset autocorrelation signal and the noise-filtered DSSS signal to obtain dot product results;

accumulate the dot product results to obtain an accumulation result; and demodulate the noise-filtered DSSS signal according to the accumulation result to obtain the demodulated signal.

19. The active stylus according to claim 18, wherein a gain of the pre-amplifier circuit is adaptively adjusted according to the sampled DSSS signal.

20. The active stylus according to claim 18, wherein:

in response to the sampled DSSS signal having an amplitude less than a first threshold, the gain of the pre-amplifier circuit is increased;

in response to the sampled DSSS signal having an amplitude greater than a second threshold, the gain of the pre-amplifier circuit is reduced;

wherein the second threshold is greater than the first threshold.

* * * * *